(12) United States Patent
Han

(10) Patent No.: US 9,283,861 B2
(45) Date of Patent: Mar. 15, 2016

(54) ON-BOARD BATTERY CHARGER FOR ELECTRIC VEHICLES AND CONTROL METHOD THEREOF

(71) Applicant: Hyundai Motor Company, Seoul (KR)

(72) Inventor: Sang-Woo Han, Daegu (KR)

(73) Assignee: Hyundai Motor Company, Seoul (KR)

( * ) Notice: Subject to any disclaimer, the term of this patent is extended or adjusted under 35 U.S.C. 154(b) by 128 days.

(21) Appl. No.: 14/069,675

(22) Filed: Nov. 1, 2013

(65) Prior Publication Data

US 2014/0361744 A1 Dec. 11, 2014

(30) Foreign Application Priority Data

Jun. 5, 2013 (KR) .................. 10-2013-0064496

(51) Int. Cl.
*H02J 7/00* (2006.01)
*B60L 11/18* (2006.01)

(52) U.S. Cl.
CPC .................. *B60L 11/1824* (2013.01)

(58) Field of Classification Search
CPC .................. H02J 7/02; H02J 7/045
USPC .......................... 320/109; 230/109
See application file for complete search history.

(56) References Cited

U.S. PATENT DOCUMENTS

| | | | |
|---|---|---|---|
| 5,736,831 A * | 4/1998 | Harrington | 320/104 |
| 2002/0097022 A1 * | 7/2002 | Saeki et al. | 320/125 |
| 2003/0102845 A1 * | 6/2003 | Aker et al. | 320/139 |
| 2005/0046387 A1 * | 3/2005 | Aker et al. | 320/125 |
| 2008/0319596 A1 | 12/2008 | Yamada | |
| 2011/0288705 A1 * | 11/2011 | Kawasaki et al. | 701/22 |
| 2011/0291621 A1 * | 12/2011 | Iles et al. | 320/145 |
| 2012/0004798 A1 * | 1/2012 | Sakamoto et al. | 701/22 |
| 2013/0127400 A1 * | 5/2013 | Oh et al. | 320/104 |
| 2014/0111121 A1 * | 4/2014 | Wu | 318/139 |
| 2014/0285133 A1 * | 9/2014 | Toledo et al. | 320/101 |
| 2014/0354195 A1 * | 12/2014 | Li et al. | 318/139 |
| 2015/0008850 A1 * | 1/2015 | Zhao et al. | 318/139 |

FOREIGN PATENT DOCUMENTS

| | | |
|---|---|---|
| JP | 09-046917 A | 2/1997 |
| JP | 2010-187468 A | 8/2010 |
| KR | 10-2011-0129518 | 12/2011 |
| KR | 10-2012-0041432 | 5/2012 |
| KR | 10-2012-0075010 | 7/2012 |

* cited by examiner

*Primary Examiner* — Suchin Parihar
(74) *Attorney, Agent, or Firm* — Mintz Levin Cohn Ferris Glovsky and Popeo, P.C.; Peter F. Corless

(57) ABSTRACT

An on-board battery charger is provided that senses a voltage value of power input from a charging facility when the charging facility is connected to charge the batteries and receives a pulse width modulation (PWM) signal of a current value of the power from the charging facility. In addition, the charger calculates an output voltage value to be output to the batteries using the sensed voltage value of the input power and an output current value to be output to the batteries using a duty value of the received PWM signal. The charger transmits the calculated output voltage and current values to a cooperating battery management system (BMS). The BMS calculates an estimated charging time using the transmitted output voltage and current values, and information regarding the calculated estimated charging time is transmitted to an external charging facility.

15 Claims, 2 Drawing Sheets

ON-BOARD BATTERY CHARGER FOR ELECTRIC VEHICLES AND CONTROL METHOD THEREOF

CROSS-REFERENCE(S) TO RELATED APPLICATIONS

This application claims priority to Korean Patent Application No. 10-2013-0064496, filed on Jun. 5, 2013, which is incorporated herein by reference in its entirety.

BACKGROUND

1. Field of the Invention

The present invention relates to an on-board battery charger for electric vehicles and a control method thereof and, more particularly, to an on-board battery charger for electric vehicles, that charges batteries of the electric vehicles using alternating current power input from a charging facility for the electric vehicles.

2. Description of Related Art

In general, such on-board battery chargers for electric vehicles operate together with a battery management system (BMS) that monitors conditions of batteries mounted within the electric vehicles and charges the mounted batteries using alternating current power input from an external charging facility for the electric vehicles. The power supplied from the charging facility has a difference in rated voltage (e.g., charge capacity), such as 220V (3.3 kW), 220V (6.6 kW), and 110V (1.7 kW).

Since an initial estimated charging time is generally calculated by determining past charging data at the onset of low-speed charging, when a type of the power supplied from the charging facility is changed, the on-board battery chargers for electric vehicles fail to reflect the change to calculate the estimated charging time. Therefore, error may occur between the estimated charging time and the actual charging time.

SUMMARY

An exemplary embodiment of the present invention provides an on-board battery charger for electric vehicles and a control method thereof, which determine charging capacity in advance according to a type of power supplied from a charging facility for electric vehicles in the initial stage of charging when connected to the charging facility, and thereby making it possible to calculate the estimated charging time to be substantially similar to an actual charging time when the type of power input from the charging facility is changed.

Other objects and advantages of the present invention may be understood by the following description, and become apparent with reference to the exemplary embodiments of the present invention. Additionally, it is obvious to those skilled in the art to which the present invention pertains that the objects and advantages of the present invention may be realized by the means as claimed and combinations thereof.

In accordance with an exemplary embodiment of the present invention, an on-board battery charger for electric vehicles, which operates together with a battery management system (BMS) and charges batteries by converting alternating current power input from an external charging facility into direct current power, may include: a first module configured to sense a voltage value of power input from the charging facility when the charging facility is connected to charge the batteries and to receive a pulse width modulation (PWM) signal of a current value of the power from the charging facility; a second module configured to calculate an output voltage value allowed to be output to the batteries using the sensed voltage value of the power and an output current value allowed to be output to the batteries using a duty value of the received PWM signal; and a third module configured to transmit the calculated output voltage and current values to the BMS. The BMS may be configured to calculate an estimated charging time using the transmitted output voltage and current values, and the estimated charging time may be received from the BMS.

In particular, the BMS may be configured to calculate charging capacity using the transmitted output voltage and current values, and when the calculated charging capacity is received from the BMS, information regarding the received estimated charging time and capacity may be transmitted to the charging facility. The cooperation (e.g., the operation) with the BMS may be determined by a controller area network (CAN) protocol. Further, the power supplied from the charging facility may have rated voltage of about 220 V or 110 V.

In accordance with another exemplary embodiment of the present invention, a control method of an on-board battery charger for electric vehicles, which operates with a battery management system (BMS) and charges batteries by converting alternating current power input from an external charging facility into direct current power, may include: sensing a voltage value of power input from the charging facility when the charging facility is connected to charge the batteries and receiving a pulse width modulation (PWM) signal of a current value of the power from the charging facility; calculating an output voltage value allowed to be output to the batteries using the sensed voltage value of the power and an output current value allowed to be output to the batteries using a duty value of the received PWM signal; transmitting the calculated output voltage and current values to the cooperating BMS; and when the BMS calculates an estimated charging time using the transmitted output voltage and current values, receiving information regarding the calculated estimated charging time from the BMS.

In particular, the control method may further include, when the BMS calculates charging capacity using the transmitted output voltage and current values, and the calculated charging capacity is received from the BMS, transmitting information regarding the received charging capacity and estimated charging time to the charging facility. The cooperation with the BMS may be determined by a controller area network (CAN) protocol. Further, the power supplied from the charging facility may have rated voltage of about 220 V or 110 V.

In accordance with an exemplary embodiment of the present invention, an on-board battery charger for electric vehicles, which operates with a battery management system (BMS) and charges batteries by converting alternating current power input from an external charging facility into direct current power, may include: a first module configured to sense a voltage value of power input from the charging facility when the charging facility is connected to charge the batteries and to receive a pulse width modulation (PWM) signal of a current value of the power from the charging facility; a second module configured to calculate an output voltage value allowed to be output to the batteries using the sensed voltage value of the input power and an output current value allowed to be output to the batteries using a duty value of the received PWM signal; and a third module configured to transmit the calculated output voltage and current values to the cooperating BMS.

When the BMS calculates charging capacity and an estimated charging time using the transmitted output voltage and current values and the calculated charging capacity and estimated charging time may be received from the BMS, information regarding the received charging capacity and estimated charging time may be transmitted to the charging facility. The cooperation with the BMS may be determined by a controller area network (CAN) protocol. Further, the power supplied from the charging facility may have rated voltage of about 220 V or 110 V.

In accordance with another exemplary embodiment of the present invention, a control method of an on-board battery charger for electric vehicles, which operates with a battery management system (BMS) and charges batteries by converting alternating current power input from an external charging facility into direct current power, may include: sensing a voltage value of power input from the charging facility when the charging facility is connected to charge the batteries and receiving a pulse width modulation (PWM) signal of a current value of the power from the charging facility; calculating an output voltage value allowed to be output to the batteries using the sensed voltage value of the power and an output current value allowed to be output to the batteries using a duty value of the received PWM signal; and transmitting the calculated output voltage and current values to the cooperating BMS.

In addition, when the BMS calculates charging capacity and an estimated charging time using the transmitted output voltage and current values and the calculated charging capacity and estimated charging time may be received from the BMS, information about the received charging capacity and estimated charging time is transmitted to the charging facility. The cooperation with the BMS may be determined by a controller area network (CAN) protocol. Further, the power supplied from the charging facility may have rated voltage of about 220 V or 110 V.

In particular, in the present invention, the output voltage value and the output current value that may be output to the batteries may be determined in the initial stage of charging based on the charging facility for electric vehicles and may be transmitted to the BMS. Therefore, the charging capacity may be determined in advance according to a type of power supplied from the charging facility. Thus, even when the type of power input from the charging facility is changed, the estimated charging time may be calculated to be substantially similar to an actual charging time. Further, in the present invention, the output current value that may be output to the batteries by the PWM signal of the current value of the input power transmitted from the charging facility may be estimated in advance via telecommunication. Therefore, the estimated charging capacity and the estimated charging time may be calculated more rapidly.

DETAILED DESCRIPTION

Figure 1:
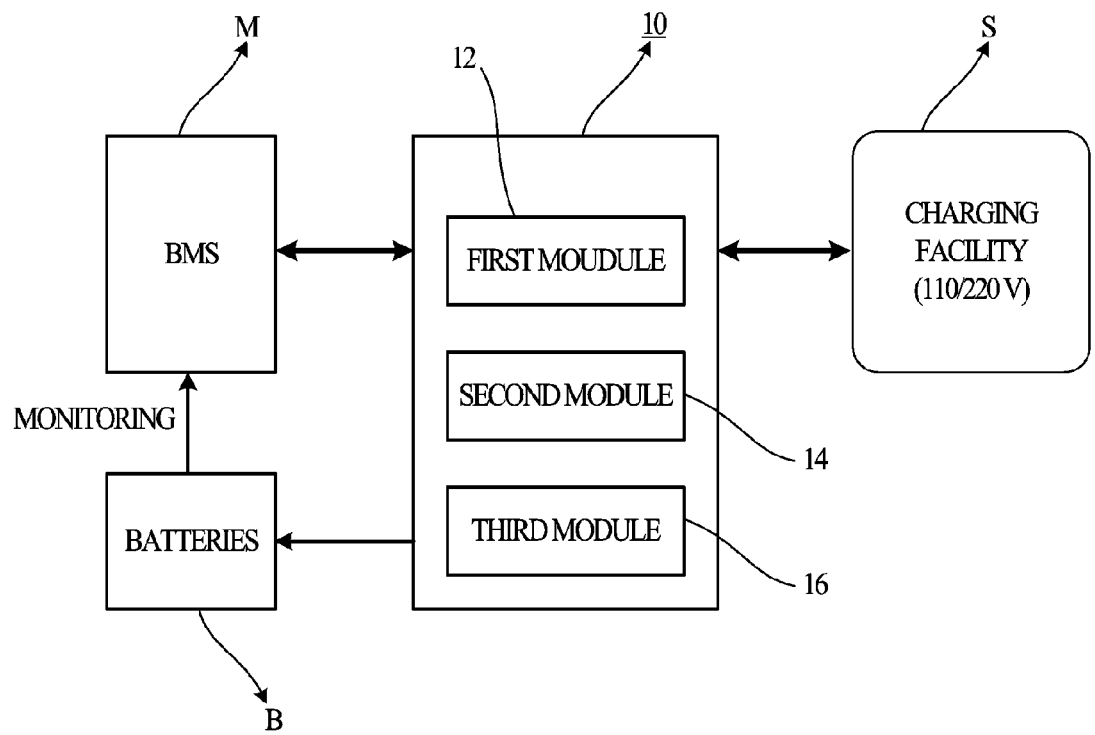
FIG. 1 is an exemplary block diagram of an on-board battery charger for electric vehicles in accordance with an exemplary embodiment of the present invention.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles, fuel cell vehicles, and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Although exemplary embodiment is described as using a plurality of units to perform the exemplary process, it is understood that the exemplary processes may also be performed by one or plurality of modules. Additionally, it is understood that the term controller refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

An on-board battery charger for electric vehicles and a control method thereof in accordance with an exemplary embodiment of the present invention will be described below in more detail with reference to the accompanying drawings. The present invention may, however, be embodied in different forms and should not be construed as limited to the embodiments set forth herein. These exemplary embodiments are provided so that this disclosure will be thorough and complete, and will fully convey the scope of the present invention to those skilled in the art. In the drawings, shapes and sizes of elements may be exaggerated for clarity.

FIG. 1 is an exemplary block diagram of an on-board battery charger for electric vehicles in accordance with an exemplary embodiment of the present invention. The on-board battery charger 10 for electric vehicles in accordance with the present embodiment cooperates (e.g., operates together) with a battery management system (BMS) and may be configured to charge batteries B by converting alternating current power input from an external charging facility into direct current power. The on-board battery charger 10 for electric vehicles may be classified into three functional modules such as a first module 12, a second module 14, and a third module 16. This functional classification is for the convenience of description. The present invention is not essentially limited to this classification.

The first module 12 may be configured to sense a voltage value of power input from the charging facility S when the charging facility S is connected via an input port and may be configured to receive a pulse width modulation (PWM) signal of a current value of the power from the charging facility S. In particular, rated voltage of the power input from the charging facility S may be about 220 V or 110 V.

The second module 14 may be configured to calculate an output voltage value that may be output to the batteries B using the voltage value of the power sensed by the first module 12 and an output current value that may be output to the batteries B using a duty value of the PWM signal received by the first module 12. For example, when a duty cycle of the PWM signal is about 27.4%, the value of output current that may be output to the batteries B may be calculated to be about 16.4 A, which is a value obtained by multiplying 27.4% of the duty cycle by 0.6, by rules that have been laid down in advance.

The third module 16 may be configured to transmit the output voltage value and the output current value calculated by the second module 14 to the cooperating BMS M. The BMS M may be configured to operate with the on-board battery charger 10 for electric vehicles and may be configured to monitor conditions of the batteries B mounted within the vehicle and to manage the batteries B based on the monitoring results. The third module 16 may be configured to determine the cooperation with the BMS M using a controller area network (CAN) protocol. In particular, the BMS M may be configured to calculate charging capacity and an estimated charging time using the output voltage value and the output current value transmitted by the third module 16 and transmit information regarding the calculated charging capacity and the estimated charging time to the on-board battery charger 10 for electric vehicles.

The third module 16 may be configured to receive the information regarding the charging capacity and the estimated charging time from the BMS M and transmit the received information regarding the charging capacity and the estimated charging time to the charging facility S.

While the exemplary embodiment of the present embodiment calculates and uses the information regarding the charging capacity in addition to the estimated charging time, a modification of the present invention may calculate and use only the information regarding the estimated charging time.

Figure 2:
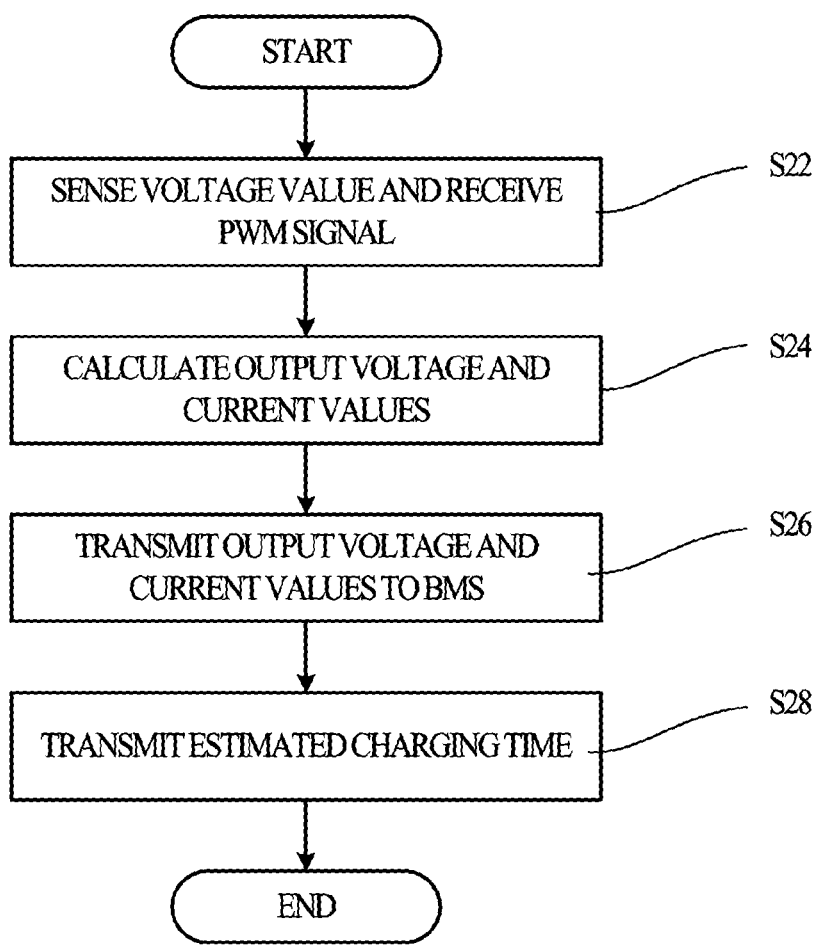
FIG. 2 is an exemplary flow chart describing a control method of the on-board battery charger for electric vehicles in accordance with the exemplary embodiment of the present invention.

Hereinafter, a control method of the on-board battery charger 10 for electric vehicles in accordance with an exemplary embodiment of the present invention will be described with reference to FIG. 2. FIG. 2 is an exemplary flow chart describing a control method of the on-board battery charger 10 for electric vehicles in accordance with an exemplary embodiment of the present invention.

First, when the charging facility S is connected to the on-board battery charger 10 for electric vehicles to charge the batteries B, the on-board battery charger 10 may be configured to sense a voltage value of power input from the charging facility S when the charging facility S is connected via an input port and may be configured to receive a pulse width modulation (PWM) signal of a current value of the power from the charging facility (S22).

Further, the on-board battery charger 10 for electric vehicles may be configured to calculate an output voltage value that may be output to the batteries B using the voltage value of the input power sensed in step S22 and an output current value that may be output to the batteries B using a duty value of the PWM signal received in step S22 (S24). The on-board battery charger 10 may be configured to transmit the output voltage value and the output current value calculated in step S24 to the BMS M (S26).

When a charging capacity and an estimated charging time are calculated by the BMS M using the output voltage value and the output current value transmitted in step S26, information regarding the calculated charging capacity and estimated charging time may be received from the BMS M and may be transmitted to the charging facility S (S28). In particular, in the on-board battery charger 10 and the control method thereof, the output voltage value and the output current value that may be output to the batteries B may be determined in the initial stage of the charging based on the charging facility S for electric vehicles and may be transmitted to the BMS M. Therefore, the charging capacity may be determined in advance according to a type of power supplied from the charging facility S. Thus, even when the type of power input from the charging facility S is changed, the estimated charging time may be calculated to be substantially similar to an actual charging time.

Further, in the on-board battery charger 10 and the control method thereof, the output current value that may be output to the batteries B by the PWM signal of the current value of the input power transmitted from the charging facility S may be estimated in advance via telecommunication. Thus, the estimated charging capacity and the estimated charging time may be calculated more rapidly.

The present invention may be provided in an on-board type that is mounted within the vehicle as in the aforementioned example, or in a separately installed type that is separately installed extraneous to the vehicle.

Although the present invention has been illustrated with regard to specific details such as specific components, limited embodiments, and drawings, the specific details such as specific components, the limited embodiments, and the drawings are only provided in order to assist overall understanding of the present invention. The prevent invention is not limited to the above exemplary embodiment, but may be variously modified and altered by those skilled in the art.

What is claimed is:

1. An on-board battery charger which cooperates with a battery management system (BMS) and charges batteries by converting alternating current power input from an external charging facility into direct current power, the on-board battery charger comprising a memory and a processor, the memory configured to store program instructions and the processor configured to execute the program instructions, the program instructions when executed configured to:

sense a voltage value of power input from the charging facility in the initial stage of charging which the charging facility is connected to charge the batteries;

receive a pulse width modulation (PWM) signal of a current value of the power from the charging facility;

calculate an output voltage value to be output to the batteries using the sensed voltage value of the input power;

calculate an output current value to be output to the batteries using a duty value of the received PWM signal; and transmit the calculated output voltage and current values to the cooperating BMS to calculate an estimated charging time.

2. The on-board battery charger of claim 1, wherein the program instructions when executed are further configured to:
receive a calculated charging capacity calculated using the transmitted output voltage and current values.

3. The on-board battery charger of claim 2, wherein information regarding the received estimated charging time and capacity is transmitted to the external charging facility.

4. The on-board battery charger of claim 1, wherein the cooperation with the BMS is determined by a controller area network (CAN) protocol.

5. The on-board battery charger of claim 1, wherein the power supplied from the charging facility has rated voltage of about 220 V or 110 V.

6. A control method of an on-board battery charger which cooperates with a battery management system (BMS) and charges batteries by converting alternating current power input from an external charging facility into direct current power, the control method comprising:
sensing, by a processor, a voltage value of power input from the charging facility in the initial stage of charging which the charging facility is connected to charge the batteries;
receiving, by the processor, a pulse width modulation (PWM) signal of a current value of the power from the charging facility;
calculating, by the processor, an output voltage value to be output to the batteries using the sensed voltage value of the input power;
calculating, by the processor, an output current value to be output to the batteries using a duty value of the received PWM signal; and
transmitting, by the processor, the calculated output voltage and current values to the cooperating BMS; and
receiving, by the processor, information regarding a calculated estimated charging time from the BMS, wherein the estimated charging time is calculated using the transmitted output voltage and current values.

7. The control method of claim 6, further comprising:
receiving, by the processor, a calculated charging capacity from the BMS calculating using the transmitted output voltage and current values.

8. The control method of claim 7, further comprising:
transmitting, by the processor, information regarding the received estimated charging time and capacity to the external charging facility.

9. The control method of claim 6, wherein the cooperation with the BMS is determined by a controller area network (CAN) protocol.

10. The control method of claim 6, wherein the power supplied from the charging facility has rated voltage of about 220 V or 110 V.

11. A non-transitory computer readable medium containing program instructions executed by a processor, the computer readable medium comprising:
program instructions that sense a voltage value of power input from the charging facility in the initial stage of charging which the charging facility is connected to charge the batteries;
program instructions that receive a pulse width modulation (PWM) signal of a current value of the power from the charging facility;
program instructions that calculate an output voltage value to be output to the batteries using the sensed voltage value of the input power;
program instructions that calculate an output current value to be output to the batteries using a duty value of the received PWM signal; and
program instructions that transmit the calculated output voltage and current values to the cooperating BMS; and
program instructions that receive information regarding a calculated estimated charging time from the calculated using the transmitted output voltage and current values.

12. The non-transitory computer readable medium of claim 11, further comprising:
program instructions that receive a calculated charging capacity from the BMS, calculated using the transmitted output voltage and current values.

13. The non-transitory computer readable medium of claim 12, further comprising:
program instructions that transmit information regarding the received estimated charging time and capacity to the external charging facility.

14. The non-transitory computer readable medium of claim 11, wherein the cooperation with the BMS is determined by a controller area network (CAN) protocol.

15. The non-transitory computer readable medium of claim 11, wherein the power supplied from the charging facility has rated voltage of about 220 V or 110 V.

* * * * *